United States Patent [19]
Ennis et al.

[11] 3,836,961
[45] Sept. 17, 1974

[54] NAVIGATION AID

[75] Inventors: Joseph C. Ennis, Sylmar, Calif.; Ray Winn, Wakefield, Mass.

[73] Assignee: Development Associates, Goleta, Calif.

[22] Filed: Aug. 14, 1972

[21] Appl. No.: 280,623

[52] U.S. Cl. ............................................. 343/6 TV
[51] Int. Cl. .............................................. G01s 9/00
[58] Field of Search.................................. 343/6 TV

[56] References Cited
UNITED STATES PATENTS
2,528,202  10/1950  Wolff................................ 343/6 TV

*Primary Examiner*—Samuel Feinberg
*Attorney, Agent, or Firm*—Nilsson, Robbins, Bissell, Dalgarn & Berliner

[57] ABSTRACT

A navigation aid for use by moving vehicles such as boats and airplanes and which utilizes ground-based radar in conjunction with television, the receiver portion being carried by the vehicle. More specifically, in one form there is disclosed a sector scan radar system which provides a typical plan position indicating (PPI) display which is viewed by a television camera. The PPI display utilizes phosphors of extremely short persistence so that effectively the only targets appearing on the PPI display are those then being illuminated by the radar signal. A television camera (vidicon) generates signals in response to the PPI display which remain on the vidicon photo mosaic until electronically removed. The signals generated by the vidicon are transmitted over a television antenna to vehicles within range of the radar. Each of the vehicles carries its own television receiver responsive to the signals transmitted from the television antenna. In addition thereto, each of the receivers carries a special circuit which receives the radar pulses transmitted from the radar antenna. The envelope representative of the radar signals is generated by a detector means. The thus generated envelope is differentiated thereby to provide a signal responsive to the moment of greatest illumination by the radar antenna which is utilized to contrast the signal then appearing on the television screen. Thus, each vehicle can identify itself independently from all other vehicles within the area of the range of the radar. The television tube carried by the vehicle utilizes long decay time phosphors of the type normally encountered in radar displays.

Also disclosed in another form is the provision of radar-generated range and azimuth information to a data processor means which may also receive data from other sources. The data processor converts the radar and other signal information to television-compatible format for subsequent transmission to vehicle-carried receivers as above disclosed.

15 Claims, 5 Drawing Figures

PATENTED SEP 17 1974　　　　　　　　3,836,961

NAVIGATION AID

BACKGROUND OF THE INVENTION

1. Field of the Invention

The invention relates generally to navigation aids and more particularly to navigation aids in which radar and television are combined.

2. Description of the Prior Art

Many systems have been proposed which use plan positon indication (PPI) display of a shore-based radar station in conjunction with a television transmitter to provide inexpensive systems for use in aircraft, ships and other moving vehicles where traffic control becomes important. In all known prior art systems, the capability of the operator to positively and easily locate his vehicle on the receiver screen without special training or external devices is lacking. Such systems traditionally display families of curves superimposed over the PPI display and may or may not include additional scales all of which must be utilized by the operator to locate his vehicle. Typical such systems are disclosed in U.S. Pat. Nos. 3,111,663; 3,111,664; ]nd 3,121,223. Such systems require special training and exercise of judgement by the operator in each case. As a result, the systems are of limited application particularly in pleasure craft used by the public generally. Typical of such systems used specifically for aircraft is the TELERAN system as disclosed in Proceedings of the IRE, pages 391–400, Vol. 38, April, 1950, entitled "Pictorial Display in Aircraft Navigation and Landing," by Loren F. Jones, H. J. Schrader and J. N. Marshall. Other prior art navigation aids known to applicants are disclosed in the following U.S. Pat. Nos.: 2,027,530; 2,226,860; 2,267,715; 2,307,029; 2,506,217; 2,961,485; 3,053,932; 3,136,999, 3,298,022; British patent No. 738,450, published Oct. 12, 1955; British patent No. 1,011,957, published Dec. 1, 1965; and Italian pat. No. 523,361, granted Apr. 15, 1955.

SUMMARY OF THE INVENTION

Radar-generated signal information is converted to television-compatible signal information. Such signal information is transmitted to vehicle-borne television receivers within range of the radar. Each of such receivers is equipped to contrast that signal on the receiver tube representative of that vehicle.

More specifically, there is transmitted a television signal consisting of a modified scene of a fixed-position radar scanning an area over which navigation assistance is to be supplied. Such scene modification includes means for transmitting video "white level" signals on the transmitted television signal, such video being representative of targets currently illuminated and acquired by said radar as well as targets which have been illuminated and acquired by said radar and then stored for subsequent television transmission on a prompt following television frame. Synchronization means for compensating for differences between said radar and said television scans is provided. Means for modification of said transmitted scene may include a hard-wired or programmed electronic data processing means receiving input signals from radar, azimuth and range signals coupled through appropriate converters, and providing output signals therefrom to television transmitter means through appropriate converters. Alternatively, an optical or electron beam scan conversion technique may be utilized such as a vidicon television camera, arranged in a manner causing illuminated sections of the vidicon face to store a proportional charge on the vidicon photo mosaic until electronically removed. This camera views a PPI display having short duration persistence phosphors energized by a fixed-position radar. The generated video signal is coupled to a television transmitter.

Vehicles within the range of the radar carry a television signal receiver means having long persistence phosphor display. Each vehicle also carries means for detecting when that vehicle is being illuminated by said fixed-position radar and in response to such illumination, signals received by said television signal receiver means during the time of said illumination are contrasted with respect to other signals appearing thereon.

The method of the present invention includes developing radar position information signals which represent various targets that may be within a specified area. The targets may be either moving targets representative of vehicles or the like or alternatively may also represent fixed targets which are hazards to moving vehicles. Such fixed targets may for example be ships which are anchored in a harbor, various derricks, oil well pumping or storage platforms, derelicts, wrecks, or the like. The thus developed radar position information signals are broadcast throughout the specified area in video form. Such broadcast video form position information signals are received by at least one of the targets represented by the position information signals. A determination is made as to when that target which is receiving the signals being broadcast is in fact being illuminated by the radar as it is developing the position information signal. That particular received position signal which is representative of the target receiving the broadcast signals is contrasted as compared to all other target signals being also received in response to the illumination of the target.

DETAILED DESCRIPTION OF THE INVENTION

As above pointed out, a navigation aid system constructed in accordance with the present invention may be utilized with any vehicle where traffic control is desirable such for example as aircraft, ships and the like.

the following description will be given in conjunction with marine traffic for illustrative purposes only.

Figure 1:
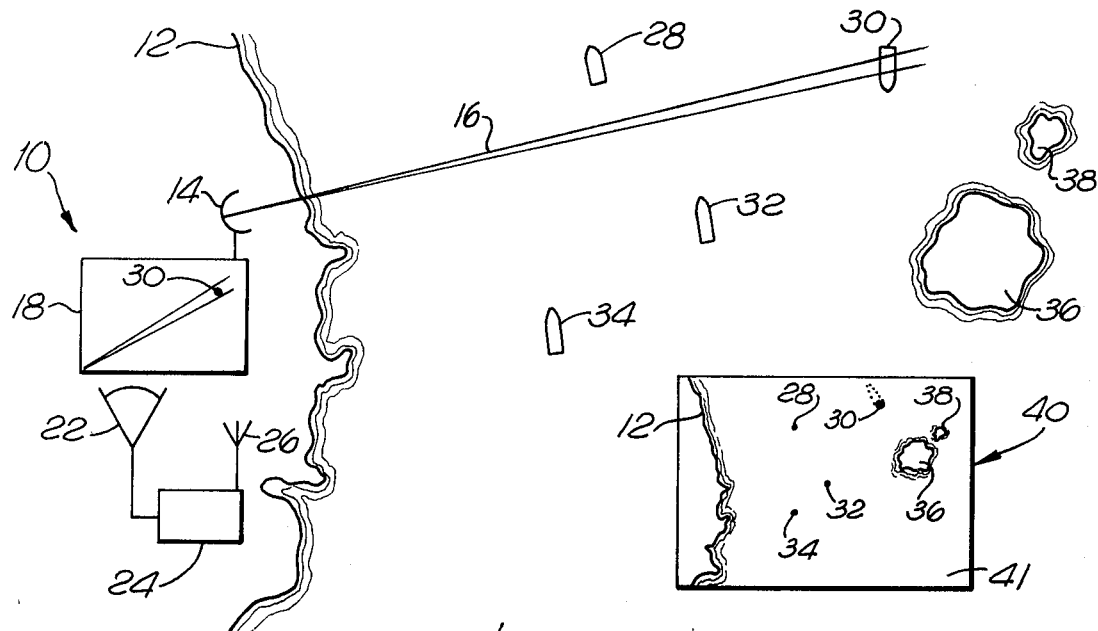
FIG. 1 is a schematic representation illustrating a portion of one form of the system of the present invention.

As is illustrated in FIG. 1, a shore-based radar shown generally at 10 would be positioned upon a fixed position such as a hill, or the like, represented by the outline 12. The antenna 14, of the radar is a sector scan antenna which is highly directional and provides a beam of energy having an arc on the order of one degree. the return energy reflected from targets in the area of concern is displayed on a plan position indicator (PPI) display 18. The PPI display 18 is constructed with phosphors having an extremely short life such that an illuminated target 30 acquired as shown at 20 on the PPI will decay in two to three microseconds after appearing on the PPI 18.

A television camera 22, such as a typical vidicon image tube type well known to the prior art is positioned so as to "view" the PPI display 18. Under certain conditions, the vidicon image tube exhibits a storage capability so that any image which the vidicon screen sees on the PPI display 18 will remain stored on the vidicon screen or photo mosaic until it is removed by the typical electronic scanning thereof. The amplified output signals generated by electronic scanning, and synchronization pulses are applied to a television transmitter 24 and are broadcast from an antenna 26 to the entire subject area within the range of the radar 10.

The frame rate of the vidicon tube camera 22 requires approximately 16 milliseconds for a full sweep thereof to thereby remove charges as a result of illumination displayed on its screen or photo mosaic. Since as above indicated, the radar is provided with extremely short duration display phosphors, the only target appearing on the PPI display 18 is that which is being momentarily acquired.

If the position of the acquired target as shown on the PPI display 18 energizes a position of the vidicon tube 22 photo mosaic corresponding to the scanning beam position thereof at that particular instant, then it can be seen that the signals then being transmitted by the television transmitter 24 include the then acquired target image. If, however, the target image produced on the vidicon 22 photo mosaic does not instantaneously correspond to the scanning beam position of the vidicon 22, then the target image will be retained on the photo mosaic of the vidicon 22 and will be removed therefrom on the next successive scan and will be then included in the scene transmitted by the television transmitter 24. therefore, a transmission of one complete frame of the vidicon tube camera 22 will include therein every target illuminated and acquired by the radar within one frame period (16 milliseconds).

As is shown in FIG. 1, there are various targets within the range of the radar such as marine traffic in the form of boats 28, 30, 32 and 34 as well as islands 36 and 38. One of the boats (preferably all of them) such as the boat 30 includes a television signal-receiving means constructed in accordance with a feature of the present invention. The television receiver means 40 includes a screen 41 of long duration phosphors thereby providing a visual display for the boat operator of the entire area of concern within range of the radar. Thus, there will be shown on the face of the screen 41 the land 12, the islands 36 and 38 as well as the additional targets 28 through 34 indicating marine craft in the area.

In accordance with a specific feature of the present invention, the television receiver means 40 is provided with appropriate circuitry which detects when the marine craft 30 is being illuminated by the energy beam 16. During the time of such illumination, the target's representation 30 on the screen 41 is intensified or brightened by electronic increase of display 41 contrast capability thus providing a direct indication to the operator of the marine craft or boat 30 of which of the targets 28 – 34 is his.

There are various ways for providing information as to the stationary objects in the area of concern such as the shoreline 12, the islands 36 and 38, wrecks, reefs or other objects that may be under the surface of the water, weather information, or the like, that any marine craft in the area should have knowledge of. this may be accomplished by providing overlays on the PPI display 18 or by providing separate lighted indications that are transmitted to the camera in the form of a map or the like through the utilization of one-way mirrors, filters or similar such materials. one specific example of an apparatus useful in providing map-type information such as the foregoing is shown in U.S. Pat. No. 2,506,127, above referred to, the disclosure of which is incorporated herein by reference.

It will also be recognized by those skilled in the art that an additional PPI display having a shorter range than the overall effective range of the radar antenna (for example one quarter of a nautical mile) may also be utilized in conjunction with a separate vidicon which also feeds the television signal transmitting apparatus 24 so as to provide two signals on a time-shared or similar basis, one of which gives a picture of the entire area of concern and the other would be concerned only with the shorter area. Thus, the operator may select by electronic cyclic blanking of display 41 which of these signals he is desirous of receiving for his navigation aid information.

Figure 2:
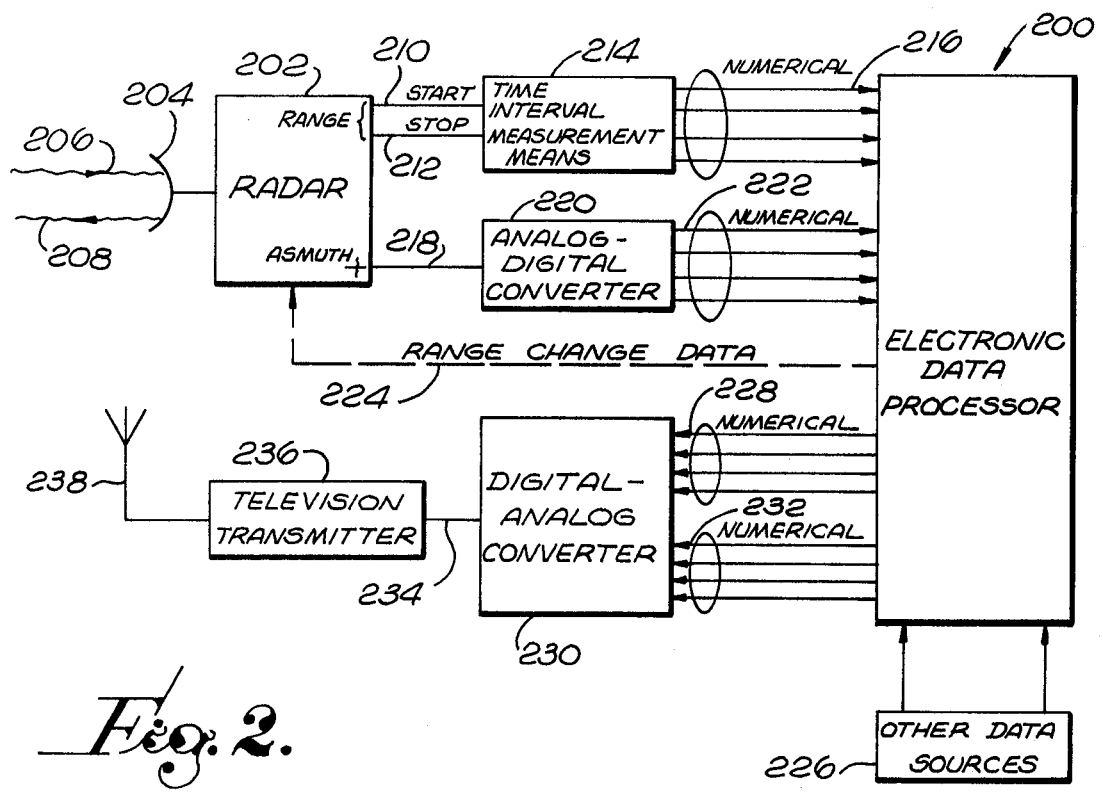
FIG. 2 is a schematic representation in block form illustrating an alternative form of a portion of the system of the present invention.

As an alternate arrangement to the utilization of a vidicon camera tube as above referred and illustrated in FIG. 1, an electronic data processor means 200 as shown in FIG. 2 may be utilized. As is therein illustrated, a radar means 202 utilizing a narrow beam antenna 204 for transmission of energy and the receipt of reflected energy from a target as illustrated by the lines 206 and 208, respectively, generates range and azimuth signal information. The range information is coupled over lines 210 and 212 to a time-interval measurement means 214. The time-interval measurement means 214 provides numerical information in computer-compatible form which is coupled by way of the cable means 216 to the electronic data processor means 200. Azimuth information is connected by way of the lead 218 to an analog-to-digital converter 220. The analog-to-digital converter provides numerical information which is coupled by cable 222 to the electronic data processor 200. If desired, range change data may be provided in response to predetermined commands from the data processor to the radar 202 as is indicated by the dashed line 224.

In addition to the signals emanating from the radar 202, the electronic data processor may also receive information from other data sources 226. Such data sources may, for example, be weather change information, updating stationary hazards within a particular navigation area or the like.

The electronic data processor 200 subjects the information received from the radar to appropriate processing and then provides numerical signals representative of the composite information regarding range and azimuth but synchronized into compatible television raster format. This information is provided over the cable 228 to a digital-to-analog converter 230. In addition, intensity data information is also generated responsive to the radar signals and provided over the cable 232 to the digital-to-analog converter means 230. A composite video signal is then generated by the digital-to-analog converter 230 and is provided over the cable 234 to the television transmitter 236 where it is then transmitted over the antenna 238 with the results above indicated.

Through the utilization of an electronic data processor means 200 as described in conjunction with FIG. 2, the radar 202 need not be fixed-position but may instead be a plurality of airborne radar systems providing information including position information of the radar to the electronic data processor which then correlates and analyzes the thus provided radar information prior to transmitting the same in television raster format.

Figure 3:
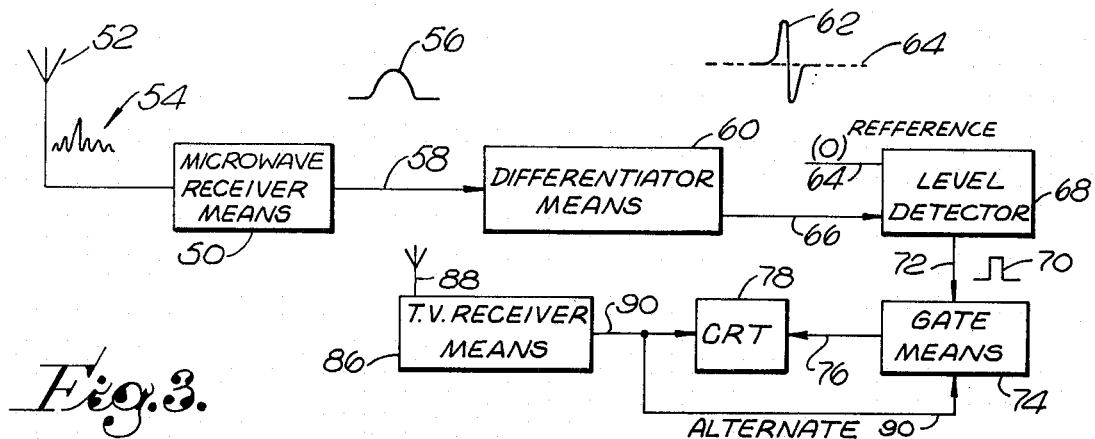
FIG. 3 is a schematic diagram in block form illustrating the receiver aboard a vehicle utilizing the navigation aid system in accordance with the present invention.

As is shown in FIG. 3, the receiver means which is carried by the marine craft 30 includes a microwave receiver means 50 which includes an antenna means 52 for receiving the radar pulses 54 from the radar means 10 or 202. The pulses 54 are averaged by the microwave receiver means 50 and appear in envelope form as shown at 56. The waveform 56 is applied by way of the lead 58 to a differentiator means 60. The differentiator means provides an output signal as shown at 62 which is the first derivative of the signal 56. As is indicated, the waveform 62 passes from a positive to a negative pulse and in doing so crosses through a reference level such as a zero line 64. The signal 62 is applied by way of the lead 66 to the level detector 68. It should be understood that the term level detector means any circuit capable of algebraically detecting the magnitude of an electrical signal as compared to a reference. the output of the level detector 68 may for example be a positive going pulse 70 which is applied by way of the lead 72 to a gate means 74. Actuation of the gate means 74 applies by way of the lead 76 a signal to the cathode ray tube (CRT) 78 of the receiver means 86 which for example may change the gain of the accelerator therein thereby to cause the electrons striking the face of the CRT to have an increased velocity, or alternatively, by way of lead 90, video supplied to CRT 78 through gate 74 may receive additional amplification during the interval of pulse 70.

Figure 4:
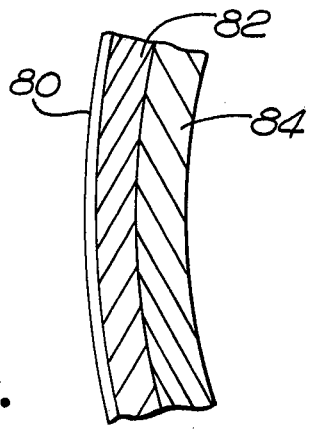
FIG. 4 is a schematic representation of a portion of the cathode ray tube used in the television signal-receiving means in accordance with the present invention; and, FIG. 5 is a schematic diagram illustrating in further detail a television signal-receiving means coupled with the radar illumination detection means in accordance with the present invention.

The phosphor on the face of the cathode ray tube (CRT) 78 may be as illustrated in FIG. 4. As is therein shown, deposited on the face 80 of the CRT is a first layer 82 of phosphors and thereover is a second layer 84 of phosphors. The second layer 84 of phosphors is responsive to electrons of a low velocity and will emit light with respect thereto. However, the layer 82 will not be energized by the low velocity electrons. Upon the actuation of the gate means 74 in response to the signal 70, the electrons striking the phosphors 84 and 82 may have substantially increased velocities as above described. As a result thereof, electrons penetrate the layer of phosphors 84 and excite the layer 82 both as a result of the direct impingement of the electrons thereon and also the generation of ultraviolet rays as a result of passing through the layer of phosphors 84. As a result, the amount of light generated by both of the layers 82 and 84 in response to the high velocity electrons is substantially increased. This substantial increase in light generation causes the signal then appearing on the CRT from the television transmitter 24 to be enhanced. Alternatively, such contrast may be provided by utilizing layers of phosphor which emit different colors of light when bombarded by electrons having different velocities. Such a structure is shown and described in U.S. Pat. No. 3,603,830 which is incorporated herein by reference.

It will be recognized by those skilled in the art that the television receiver 86 receives by way of its antenna 88 the signals being transmitted from the television antenna 26 or 238. The signals from the receiver means 86 are applied over the lead 90 to the CRT 78 to provide the target representation and area picture as shown on the screen 41, FIG. 1. Only when the marine craft 30 is directly illuminated by the energy beam 16 will the pulses 54 be received by the microwave receiver means 50 and only when there is a zero crossing detected by the level detector 68 will the gate 74 cause enhancement of the signal appearing on the face of the CRT 78 as above described.

Figure 5:
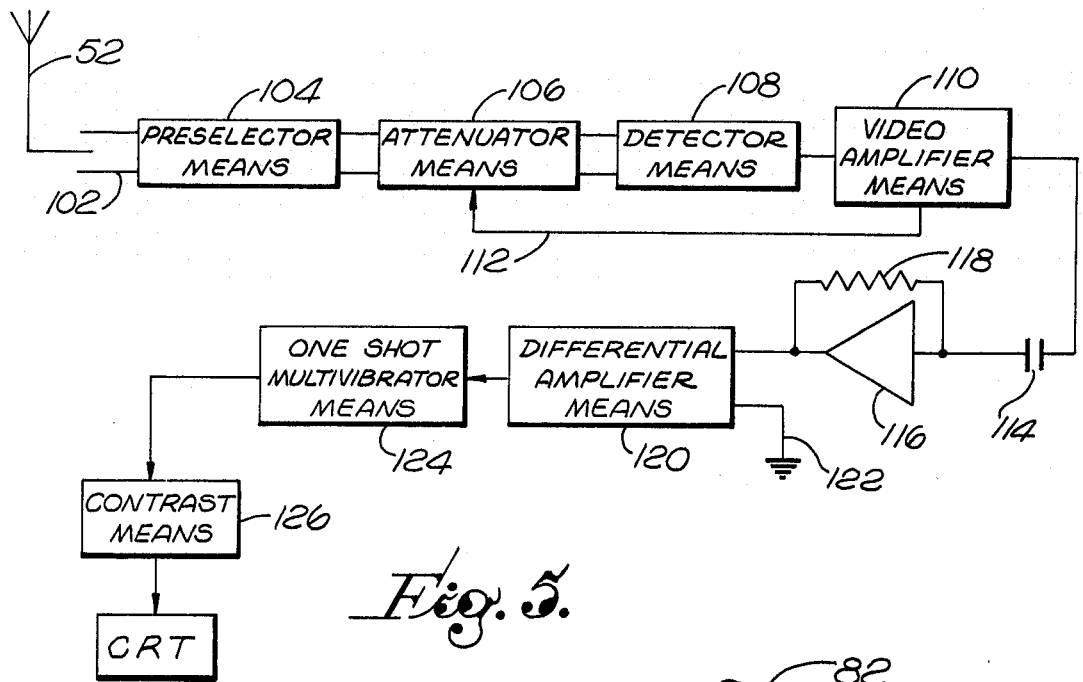

Referring now to FIG. 5, the circuit as illustrated in FIG. 3 is shown in more detail. As is therein illustrated the antenna 52 feeds an input waveguide means 102. A preselector means 104 forms a part of the waveguide means 102 and may take the form of a resonant cavity or other filter apparatus which functions to reduce the interference from other radar systems that may be operating in the same general vicinity but at frequencies other than those of the radar 10 or 202. An attenuator means 106 is inserted in the waveguide 102 and functions in two specific fashions. One is to preclude the detector means from being overloaded when the marine craft 30 is relatively close to the radar transmitter 10 or 202. The second feature of the attenuator means is that it assists in normalizing the signal level as the distance between the radar transmitter and the marine craft 30 changes. By thus normalizing the signal level, the subsequent signal processing is substantially simplified. the output of the attenuator means 106 is then applied by the waveguide 102 to a detector means 108 which may be the standard video type diode detector, as is well known in the radar beacon art. The output of the detector means is applied to a video amplifier means 110. A portion of the signal generated by the video amplifier means is applied by way of a feedback path 112 to the attenuator means 106. Thus, the attenuator means is caused to function to either more or less attenuate the input signal received by the antenna 52 depending upon the proximity of the marine craft to the transmitter 10 as above referred to. The output of the video amplifier means is in the form of the envelope 56 as shown in FIG. 3. This signal is passed through the capacitor 114 to the operational amplifier 116 which has the feedback resistor 118 connected from the output to the input thereof. A combination of the operational amplifier 116, the capacitor 114 and the feedback resistor 118 function to differentiate the signal 56 and to provide the waveform as shown at 62 in FIG. 2 and may be referred to as an active differentiator. The waveform 62 is applied to a differential amplifier means 120 which has one input 122 thereof connected to ground. As the signal 62 crosses the zero reference line, the differential amplifier means 120 provides a change in output signal such that it triggers the one-shot multivibrator 124 which in turn actuates a contrast means 126 to change the gain of the accelerator in the CRT as above described.

Although various specific elements have been referred to and shown in schematic block form, various alternatives will readily be known to those skilled in the art and may be used without departing from the spirit or scope of this patent.

What is claimed is:

1. A navigation aid comprising;
   A. radar means including a directional antenna having scanning means and a receiver means providing range and azimuth of acquired targets;
   B. converter means associated with said radar means, said converter means providing currently acquired target data in conventional broadcast television raster format only as said data is acquired by said radar means;
   C. a television signal transmitting means connected to said converter means for transmitting said television raster format signals indicative of said currently acquired targets to that predetermined area within the range of said radar means;
   D. a vehicle carried television signal receiver means having long persistence display therein and adapted for receiving signals transmitted by said television transmitting means;
   E. means for detecting when said vehicle is being illuminated by said radar means; and
   F. means responsive to said detecting means for contrasting on said receiver display means any television signals representative of only those radar illuminated and currently acquired targets received during a predetermined time representative of said vehicle being illuminated by said radar means, whereby only that target being currently illuminated by said radar will be contrasted with respect to all other targets appearing on said receiver display means.

2. A navigation aid comprising:
   A. a fixed position radar means having a directional antenna;
   B. a plan position indicating display means connected to said radar means, said display means having phosphors of short duration persistence whereby a target will be displayed on said display means substantially only when illuminated by said radar means;
   C. a television camera means disposed to view said display means and having a storage photo mosaic whereby targets illuminated by said radar will appear on said camera means and remain thereon until electronically removed as a result of scanning;
   D. a television signal transmitting means connected to said camera means for receiving targets removed from said camera means by said scanning and transmitting signals indicative of radar acquired targets to that predetermined area within the range of said radar means, whereby only currently acquired target data is provided in television raster format;
   E. a vehicle carried television signal receiver means having long persistence display therein and adapted for receiving signals transmitted by said television transmitting means;
   F. means for detecting when said vehicle is being illuminated by said radar means; and
   G. means responsive to said detecting means for contrasting on said receiver display means any television signals representative of only those radar illuminated targets received during a predetermined time representative of said vehicle being illuminated by said radar means.

3. A navigation aid as defined in claim 1 wherein said receiver means includes a cathode ray tube having a first and second layer of phosphors, one of said layers providing response to electrons of a predetermined velocity impinging thereon different from the other of said layers.

4. A navigation aid as defined in claim 1 wherein said detection means includes a microwave receiver means responsive to signals transmitted from said radar means, said microwave receiver means providing an output signal only when a signal from said radar means is directed thereto.

5. A navigation aid as defined in claim 4 wherein said means responsive to said detecting means includes accelerator gain change means operative responsive to said vehicle being illuminated to automatically increase the velocity of electrons striking the cathode ray tube in said signal receiver means.

6. A navigation aid as defined in claim 1 wherein said converter means is a vidicon camera tube means having storage photo mosaic means positioned to receive signals from said radar receiver means.

7. A navigation aid as defined in claim 1 wherein said converter means includes an electronic data processing means, means coupling signal information in appropriate format from said radar means to said electronic data processing means, and means coupling signal information in appropriate format from said data processing means to said television transmitter means.

8. A navigation aid as defined in claim 2 wherein said receiver means includes a cathode ray tube having a first and second layer of phosphors, one of said layers providing response to electrons of a predetermined velocity impinging thereon different from the other of said layers.

9. A navigation aid as defined in claim 2 wherein said detection means includes a microwave receiver means responsive to signals transmitted from said radar means, said microwave receiver means providing an output signal only when a signal from said radar means is directed thereto.

10. A navigation aid as defined in claim 9 wherein said means responsive to said detecting means includes accelerator gain change means operative responsive to said vehicle being illuminated to automatically increase the velocity of electrons striking the cathode ray tube in said signal receiver means.

11. Vehicle carried receiver means for use in conjunction with a radar system having a directional antenna and television signal transmitting means adapted to transmit target data signals representative of only those targets which are being currently illuminated and acquired by said radar means, said receiver means comprising:
   A. a visual display means;
   B. means for detecting when said vehicle is being illuminated by said radar means; and
   C. means responsive to said detecting means for intensifying received target signals during a predetermined time representative of said illumination of said vehicle whereby the target image on said visual display means representative of said vehicle is contrasted from other target images thereon.

12. Vehicle carried receiver means as defined in claim 11 wherein said visual display means includes a cathode ray tube having a first and second layer of phosphors, one of said layers providing response to electrons of a predetermined velocity impinging thereon different from the other of said layers.

13. Vehicle carried receiver means as defined in claim 11 wherein said means for detecting includes a microwave receiver means responsive to signals transmitted from said radar means, said microwave receiver means providing an output signal only when a signal from said means is directed thereto.

14. Vehicle carried receiver means as defined in claim 13 wherein said microwave receiver means includes an attenuator means, and means for producing an output signal; feedback means connecting said output signal to said attenuator means for automatically maintaining the signal applied to said means for producing an output signal substantially constant irrespective of proximity to said radar.

15. The method of providing navigational information to vehicles comprising:
   A. developing radar position information signals representative of all targets within a specified area;
   B. broadcasting said signals as acquired throughout said specified area in video form;
   C. receiving said broadcast signals by at least one of said targets;
   D. determining when said one of said targets is being illuminated by said radar for development of its position signal information; and
   E. contrasting only said received position signal of said one target as compared to all other targets responsive to said illumination of said one target.

* * * * *